United States Patent

[11] 3,572,886

| [72] | Inventors | Robert E. Curtiss<br>Cupertino;<br>Frank F. Rand, Jr., Los Altos Hills, Calif. |
|---|---|---|
| [21] | Appl. No. | 819,794 |
| [22] | Filed | Apr. 28, 1969 |
| [45] | Patented | Mar. 30, 1971 |
| [73] | Assignee | Lockheed Aircraft Corporation<br>Burbank, Calif. |

[54] DUAL POWER TELESCOPE
1 Claim, 8 Drawing Figs.

[52] U.S. Cl. ..................................... 350/20,
350/212, 350/54
[51] Int. Cl. .................................... G02b 23/00
[50] Field of Search .......................... 350/20, 37,
38, 42, 54, 194, 212; 356/(Inquired)

[56] References Cited
UNITED STATES PATENTS

| 729,848 | 6/1903 | Common | 350/194 |
|---|---|---|---|
| 936,541 | 10/1909 | Kellner | 350/42 |
| 1,042,346 | 10/1912 | Henle | 350/38UX |
| 1,290,777 | 1/1919 | O'Brien | 350/20 |
| 2,409,186 | 10/1946 | Bouwers | 350/20 |
| 3,173,012 | 3/1965 | DeWinter | 350/20X |

*Primary Examiner*—David H. Rubin
*Attorneys*—Robert B. Kennedy and George C. Sullivan

ABSTRACT: A dual-power telescope is disclosed comprising objective means, an eyepiece, and a Galilean telescope adapted to be interposed therebetween with the Galilean ocular positioned between the objective means and its focal plane and the Galilean objective positioned between the eyepiece and the focal plane of the objective means.

PATENTED MAR 30 1971　　　3,572,886
SHEET 1 OF 3
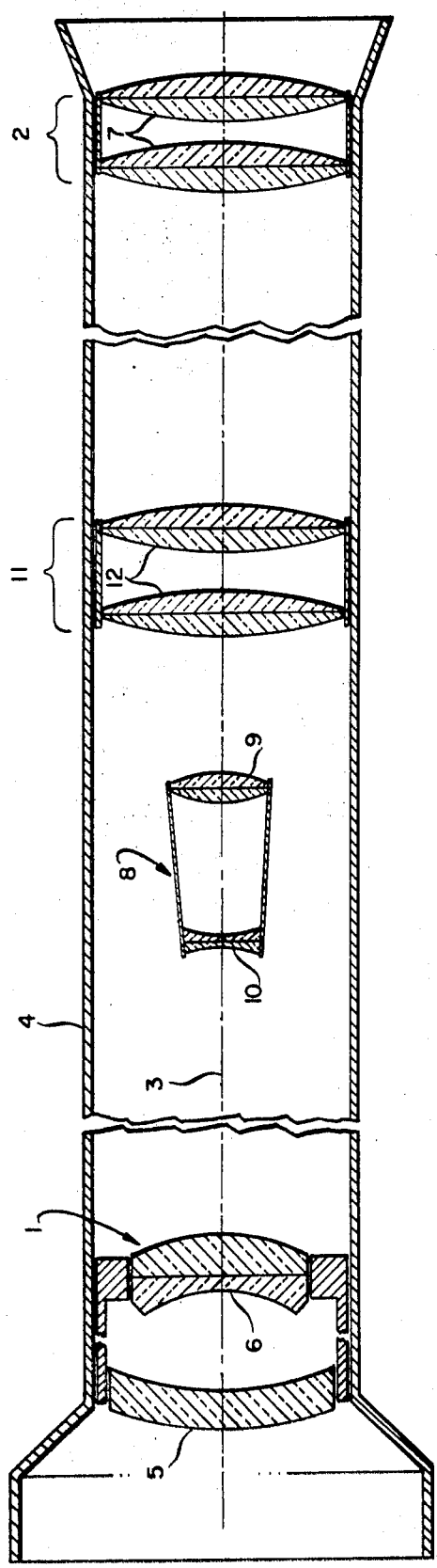
FIG_1
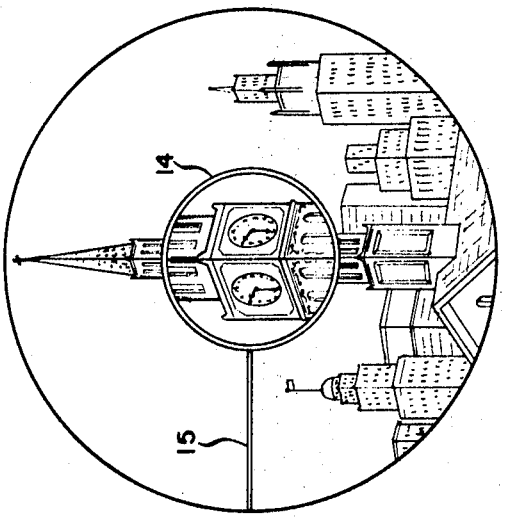
FIG_4
INVENTORS
ROBERT E. CURTISS
FRANK F. RAND, JR.
By George C Sullivan, agent
Robert B. Kennedy
Attorney PATENTED MAR 30 1971　3,572,886
SHEET 2 OF 3
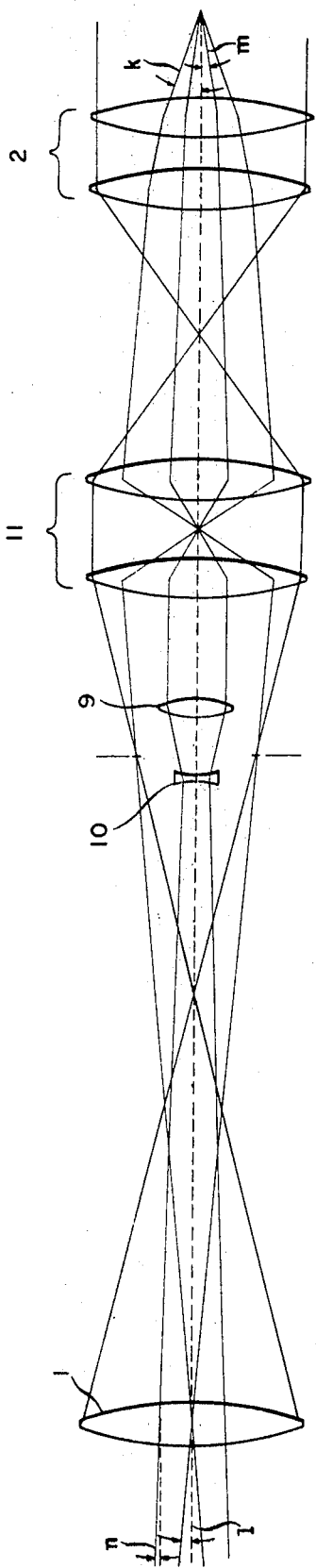
FIG_3
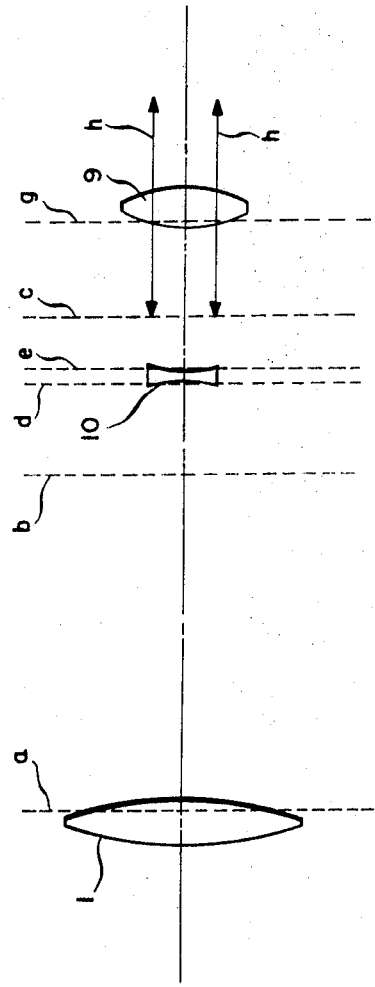
FIG_2
*INVENTORS*
ROBERT E. CURTISS
FRANK F. RAND, JR.
By *George C. Sullivan, agent*
   *Robert B. Kennedy*
        Attorney PATENTED MAR 30 1971 3,572,886
SHEET 3 OF 3
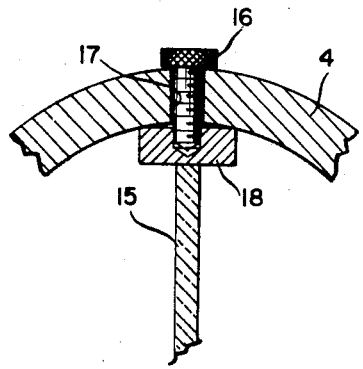
FIG_5
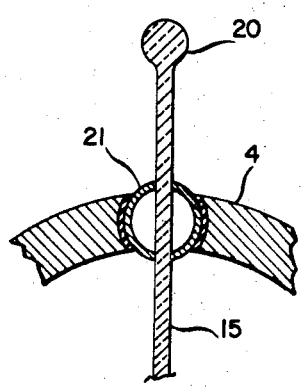
FIG_6
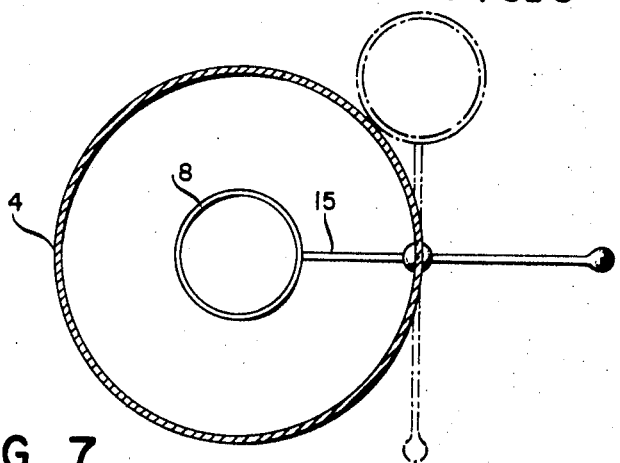
FIG_7
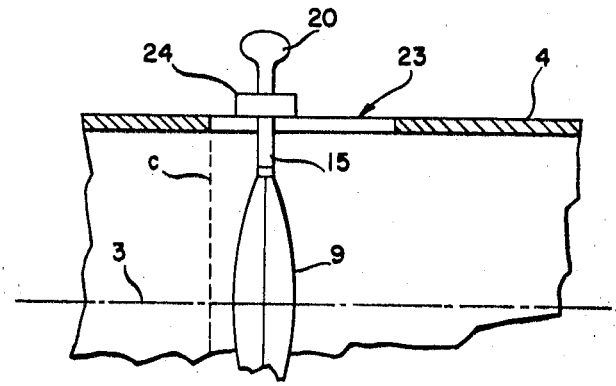
FIG_8
INVENTORS
ROBERT E. CURTISS
FRANK F. RAND, JR.
By George C. Sullivan, agt
Robert B. Kennedy
Attorney

DUAL POWER TELESCOPE

BACKGROUND OF THE INVENTION

This invention relates generally to telescopes, and particularly to dual-power telescopes.

Heretofore, dual-power telescopes have typically been of the split-field type. Such scopes enable an object to be viewed under two different powers of magnification simultaneously with a single eyepiece. The field of view, by which is means the angular expanse which may be seen through the telescope eyepiece, is divided into two parts. One part contains the scene under relatively low magnification while the other part contains a smaller portion of the scene under higher magnification. Such scopes have found particular utility in weapon carriers such as tanks and other armored vehicles. They are exemplified by U.S. Pat. Nos. 2,388,673, 2,512,153 and 2,527,719.

In addition to the split-field type of dual-power telescopes there have also heretofore existed scopes, such as that shown in U.S. Pat. No. 3,064,526, through which a field of view may be seen by means of a single eyepiece, one portion of which is magnified and another portion of which is not. Furthermore, as seen by reference to U.S. Pat. 2,409,186, telescopes have also been devised in which a portion of a magnified field of view is magnified still further. It is this particular type of dual-power telescopes with which the present invention is particularly concerned.

Dual-power telescopes of the type providing a magnified field of view, a portion of which is magnified to a greater power than the balance of the field, provide observers distinct advantages over the use of two independent telescopes of different magnifications or the use of a single telescope system having two independent eyepieces through which a field of view may be seen under variant degrees of magnification. They similarly offer advantages over the use of a single telescope having interchangeable eyepieces capable of sequentially providing multiple degrees of magnification. The principal advantage here rests with the avoidance of reorientation in shifting magnifications which is made possible when a portion of a magnified field of view is magnified to a greater extent than the balance of the field. With such a dual-power telescope an observer may use the less magnified field of view for scanning or finding purposes. An object found to be of particular interest may then be observed in greater detail within that portion of the field under higher magnification without having to change eyepieces or move one's head and in doing so risk losing one's sense of orientation.

The principal problems associated with the just-described telescopes of the prior art have arisen from their complexity. The dual-power telescope system depicted in U.S. Pat. No. 2,409,186, for example, requires two parallel casings and a number of mirrors and lenses spaced apart within relatively concise tolerance ranges. Here light within the higher magnified portion of the field of view traverses three lens systems and is reflected by four independent mirrors. The presence of these numerous optical elements compounds many of the problems commonly associated with optical systems such as those of spherical and chromatic aberration. Their cost and susceptibility to damage is also high.

Accordingly, it is the general object of the present invention to provide an improved telescope.

More specifically, it is an object of the present invention to provide an improved dual-power telescope in which two portions of a field of view may be simultaneously observed, the magnification of each portion differing from that of the other portion.

Another object of the invention is the same as the preceding object in which the magnification of each portion of the field of view may be varied.

Another object of the invention is to provide a dual-power telescope having two concentric, annular fields of view with the inner field being magnified to a greater power than the outer field.

Yet another object of the invention is to provide a dual-power telescope productive of a magnified field of view in which an annular portion of the field of view is of higher magnification than the balance of the field, and in which the more highly magnified portion is ambulatory with respect to the lesser magnified portion.

Still another object of the invention is to provide a dual-power telescope of relatively simple and economic construction and which does not require the presence of mirrors.

SUMMARY OF THE INVENTION

Briefly described, the present invention is an improved telescope having objective means and an eyepiece spacially separated along the telescope axis a distance greater than the focal length of the objective means. A Galilean telescope is disposed between the objective means and eyepiece with the Galilean telescope objective spaced from the objective means a distance greater than said focal length and the Galilean telescope ocular spaced from the objective means a distance less than said focal length.

BRIEF DESCRIPTION OF THE DRAWING

FIG. 1 is a diagrammatical view in cross section of a preferred embodiment of a telescope incorporating principals of the present invention.

FIG. 2 is a schematic illustration of a preferred relative disposition of certain optical elements of the telescope shown in FIG. 1.

FIG. 3 is a tracing of sample light rays through the optical elements shown in the telescope of FIG. 1.

FIG. 4 is an example of the appearance of a field of view which may be observed through the eyepiece of the telescope shown in FIG. 1.

FIG. 5 is a fragmentary view in cross section of mounting means for certain optical elements shown in FIG. 1.

FIG. 6 is another fragmentary view in cross section of mounting means for certain optical elements shown in FIG. 1.

FIG. 7 is an end view of a telescope incorporating principals of the present invention having means for removing one or more optical elements from the field of view.

FIg. 8 is a fragmentary, profile view, partly in cross section, of yet another mounting arrangement for one or more optical elements in a telescope capable of providing variable magnification of a portion of the field of view.

DESCRIPTION OF THE PREFERRED EMBODIMENTS

Referring now in more detail to the drawing, there is shown in FIG. 1 a telescope adapted for terrestrial viewing which embodies principles of the present invention. The telescope comprises an objective 1 and an eyepiece 2 coaxially mounted along telescope axis 3 within telescope housing 4. The objective chosen here is of the telephoto-type comprising a convergent front element 5 and a divergent rear element 6. A telephoto-type objective is preferred for its capacity of providing a relatively high ratio of magnification to focal length and thus relatively high magnification for a telescope of given overall length. Such type an objective also provides variable magnification powers, or course. Where desired, other types of objectives such as wide angle, achromatic or even thin lenses may be substituted for the telephoto-type objective. The eyepiece selected here is of the orthoscopic type comprising two spaced, convergent, achromatic lenses 7. Other type of eyepieces could, of course, be substituted.

A Galilean telescope 8, comprising a convergent objective lens 9 and a divergent ocular 10, is coaxially mounted along telescope axis 3 between objective 1 and eyepiece 2 within telescope housing 4. By the term "Galilean telescope" is meant the combination of divergent and convergent lens means spacially separated along a common optical axis. Objective lens 9 and ocular 10 are preferably doublets. The maximum diameter of the Galilean telescope shown here is approximately one-third that of frontal element 5 of objective 1 although it could be substantially larger and still provide dual-power magnification in combination with objective 1 and eyepiece 2. The diameter of ocular 10 is somewhat smaller than objective lens 9.

Mounted between Galilean telescope 8 and eyepiece 2 is a zero-power erector system 11 comprising two convergent lenses 12 which also are preferably doublets. If desired, a reticle may be incorporated between the eyepiece and erector system.

Galilean telescope 8 is positioned so as to have objective lens 9 and ocular 10 straddle the focal plane of objective 1. Preferably, ocular 10 is positioned with one of its focal plane located within the Galilean telescope approximately conjugate with the focal plane of objective 1. Objective lens 9 is preferably disposed a distance approximating the focal length of lens 9 less the other focal length of the ocular as measured outside the Galilean telescope along the optical axis thereof. With these relative dispositions light rays which pass through both the telescope comprising objective 1 and eyepiece 2 and Galilean telescope 8, and light rays which pass through the telescope without traversing the Galilean telescope, are both focused upon a common focal plane accessible for eye viewing. It should be understood however that neither ocular 10 nor objective lens 9 need necessarily occupy these precise positions provided they straddle the focal plane of objective 1. Indeed, objective lens 9 may be mounted for relative movement with respect to ocular 10 along their optical axis beyond the focal plane of objective 1 by such means as will hereinafter be described. Such adaptation permits variations to be made in the magnification of the image observed through the Galilean telescope in zoom fashion without defocusing.

The just described and preferred relative positions of objective 1 and the elements of Galilean telescope 8 are shown in greater detail in FIG. 2 in which line *a* represents the principal plane of objective 1 located closest to the Galilean telescope, lines *b* and *c* represent the two focal planes of ocular 10, lines *d* and *e* represent two principal planes of ocular 10, and line *g* represents the principal plane of objective lens 9 located closer to ocular 10. In addition to representing a focal plane of ocular 10, line *c* also represents a focal plane of objective 1. Similarly, line *c*, in addition to representing another focal plane of ocular 10, also represents a focal plane of objective means 9. Arrows *h* traversing objective means 9 denote the fact that the objective means may occupy various positions to the right of line *c*.

FIG. 3 illustrates several ray tracings through the telescope shown in FIG. 1 from which it is apparent that in passing through the telescope some rays pass through the Galilean telescope while others do not. This is productive of a field of view such as that diagrammatically shown in FIG. 4. Note here that two concentric portions of the field of view are under two different powers of magnification. The magnification of the inner field, which actually is viewed through he Galilean telescope, is magnified approximately 3 times the image of the outer field portion where the magnification provided by the Galilean telescope alone is three. Thus the magnification of the inner field is the product of the magnification afforded by the Galilean telescope alone and the magnification provided by objective 1 in combination with eyepiece 2.

With reference once again to FIG. 3, it will be confirmed that angle *k* is some 3 times greater than angle 1, and angle *m* some 9 times greater than angle *n*.

In FIG. 4 the inner and outer field portions are seen to be demarcated by image ring 14 which is formed by the annular housing of Galilean telescope 8. The image of a thin vane 15 is also shown. This vane, which may be made of either metal or transparent material such as glass, provides support for the Galilean telescope. Vane 15 extends to housing 4 where it may be mounted in various manners. FIG. 5 is illustrative of a fixed mount in which screw 16 extends through hole 17 within housing 4 and into shoe 18 which in turn is fixed to vane 15. Alternatively, vane 15 may extend to the exterior of the housing where it is manually accessible and mechanically adapted for movement within the telescope housing by means of an X-Y positioning drive mechanism. One such mechanism is illustrated in FIG. 6 in which vane 15 passes through a slot in cylinder 21, which cylinder is rotatably mounted within housing 4. By manually moving knob 20, vane 15 may be moved in the plane of the FIG. either by sliding within the cylinder slot or by causing the cylinder itself to rotate.

FIG. 7 illustrates yet another mounting arrangement by means of which the Galilean telescope may be completely removed from the field of view observable through eyepiece 2. Here the Galilean telescope may be flipped in and out of housing 4 through a longitudinal slot therewithin. If desired, the slot may be bounded with magnetic material to hold the Galilean telescope in the withdrawn position illustrated by dashed lines in the FIG. For such adaptation a portion of vane 15 itself is preferably metallic. A cover may also be placed about this outer position to prevent dust and light from entering the slot.

FIG. 8 illustrates still another mounting arrangement which provides means for varying the magnification of the image seen through the Galilean telescope. Here vane 15 extends through slot 23 in housing 4. Collar 24 is fixed about the vane overlaying the edges of the slot thereby enabling an observer to slide the vane along the axis of the telescope by means of knob 20. In the illustration objective lens 9 is mounted for movement along telescope axis 3. Obviously, it may be adapted by means of parallel bar guides to move along the optical axis of the Galilean telescope itself, parallel to axis 3.

Certain advantages offered by the described telescopes become readily apparent from FIG. 4. The outer image here provides a relatively large field of view for scanning. Once an object of interest has been found in this relatively large field the telescope may be directed to the object thereby placing it within the inner field where it may be observed under higher magnification. Alternatively, the inner field may be moved off the axis of the outer field without a repositioning of the telescope as a whole by means of the mechanism described in FIG. 6. The magnification of the inner field or of both fields may then be increased. With neither of these operations need the observer lose his orientation within the field of view as might well be the case should one have to change oculars or resight through an independent scope of higher magnification. Furthermore, from structural and optical viewpoints the telescope provides simultaneous dual-power viewing without the need for any mirrors and with relatively few optical elements of any nature. In addition, the image in both fields are sharply focused with a minimum of spherical chromatic aberration.

It should be understood that the described embodiments are merely illustrative of principles of the invention. Obviously, many modifications may be made thereto without a departure from the spirit and scope of the invention as set forth in the following claims. One such modification worthy of express note is that of eliminating the negative lens element of the Galilean telescope entirely. While this modification is not preferred due to the resulting degradation in image quality, it nevertheless is operatively feasible.

We claim:

1. A dual power telescope for simultaneously viewing two superposed images of the same object at different magnifications comprising an elongated housing, objective lens means, erector lens means and eyepiece lens means mounted in said housing in optical alignment along a common optical axis, said objective lens means forming an image of the object at the objective focal plane and the image being relayed by said erector lens means to the focal plane of said eyepiece lens means, a Galilean telescope having a convergent objective lens and a divergent ocular lens, said Galilean telescope being positioned on said optical axis between said objective lens means and said erector lens means, with said divergent ocular lens facing said objective lens means and located between said objective lens means and said objective focal plane and with said convergent objective lens facing said erector lens means and located between said erector lens means and said objective focal plane, the diameter of said Galilean telescope lenses being appreciably less than the diameters of said objective lens means and said erector lens means, and appreciably less than the diameter of the image formed at the objective focal plane, thin vane means extending radially inward from said elongated housing and adjustably supporting said Galilean telescope lenses, and external adjusting means connected to said thin vane means for moving at least said convergent objective lens of said Galilean telescope along the optical axis.